Patented Dec. 6, 1949

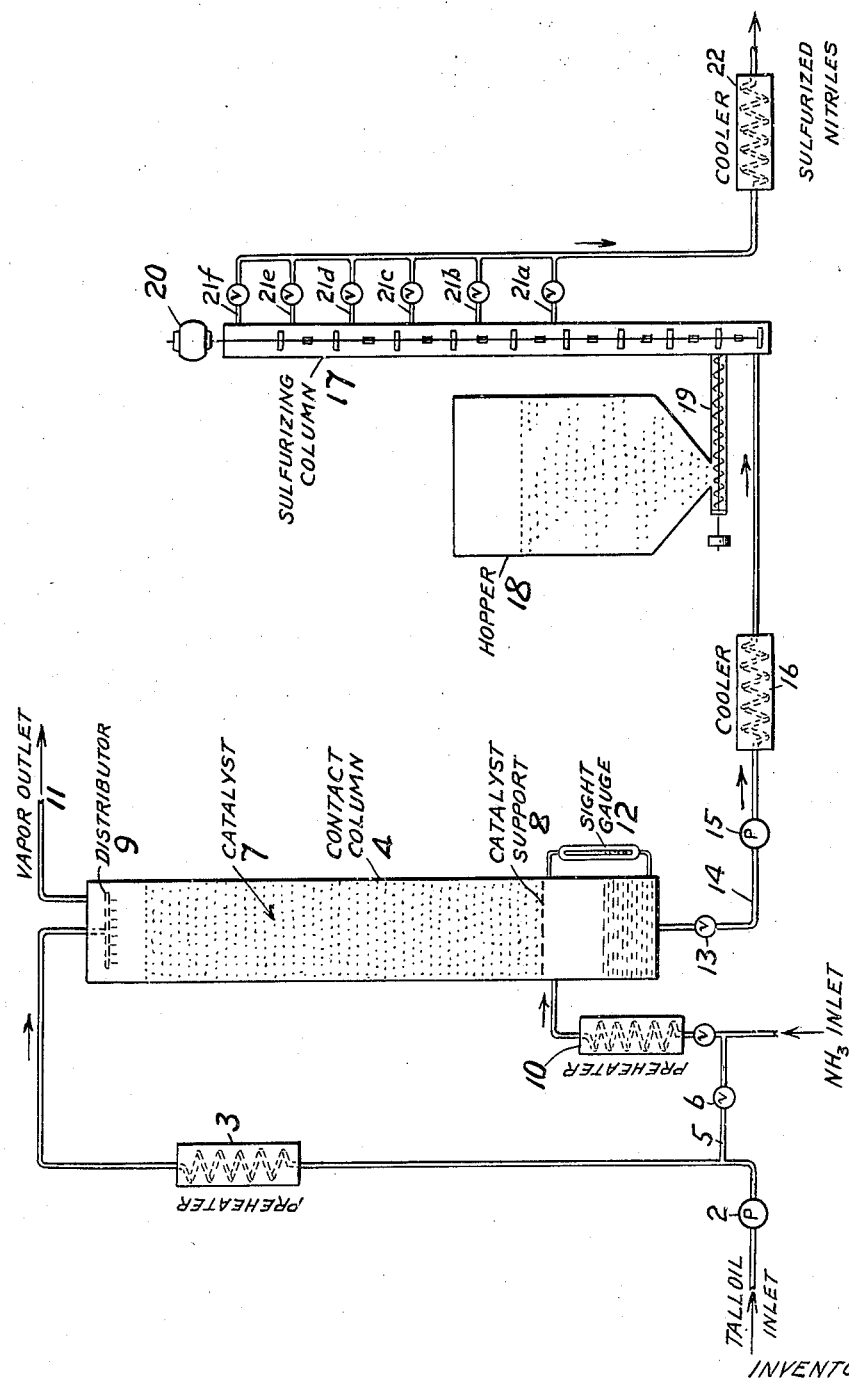

2,490,271

UNITED STATES PATENT OFFICE 2,490,271

SULFURIZED NITRILES AND PROCESS OF PREPARING THE SAME

Samuel Edward Jolly, Prospect Park, Pa., assignor to Sun Oil Company, Philadelphia, Pa., a corporation of New Jersey Application June 25, 1943, Serial No. 492,227

3 Claims. (Cl. 260—97.5)

This invention relates to sulfurized nitriles and to their preparation, and more particularly concerns sulfurized nitriles which are soluble in mineral lubricating oils and which have characteristics imparting utility as special lubricants. The invention particularly contemplates the preparation of oil-soluble sulfurized nitriles from starting materials containing higher molecular weight organic acids, such as fatty and rosin acids, in two major steps comprising conversion of the acids to nitriles and sulfurization of the nitriles.

Numerous methods of converting fatty acids into nitriles are known, some of which are of only academic interest while others have shown commercial value. In the latter methods the conversion generally has been effected by causing the fatty acids and ammonia to react in either liquid or vapor phase according to the following reactions:

(1) $RCOOH + NH_3 \rightarrow RCOONH_4$
(2) $RCOONH_4 \rightarrow RCONH_2 + H_2O$
(3) $RCONH_2 \rightarrow RCN + H_2O$ Ralston et al. U. S. Patent 2,061,314 discloses a method of effecting these reactions in liquid phase, and Potts et al. U. S. Patent 2,314,894 discloses an improved method comprising both liquid and vapor phase reactions. Methods wherein these reactions have been carried out wholly in vapor phase in many cases have proved unsatisfactory due to decomposition of the fatty acids on vaporization. In the present invention the methods disclosed in the above mentioned patents as well as other known methods may be used to form the nitriles from some starting materials; however, with certain preferred starting material, these methods are not altogether satisfactory, as is more fully explained hereinafter. Accordingly an improved method, which more adequately fulfills requirements of the present invention, has been devised and the invention includes as one of its features such improved method for converting organic acids to nitriles.

It is known to prepare certain reaction products from fatty acid nitriles for use in extreme pressure lubricants. Ralston U. S. Patents 2,125,853 and 2,141,142 disclose the preparation of reaction products of nitriles with sulfur monochloride or with sulfur monochloride and sulfur and their use in extreme pressure lubricants. These products contain both sulfur and chlorine in chemical combination. In contradistinction the sulfurized products of the present invention, which are prepared by reacting free sulfur with nitriles under specially controlled conditions and which also are valuable in the manufacture of lubricants to be used under severe service conditions, contain chemically combined sulfur but no chlorine.

In accordance with this invention, oil-soluble sulfurized nitriles are prepared from starting materials such as stearic acid, oleic acid, lard oil acids and other fatty acids of animal, vegetable or marine origin which have at least ten carbon atoms, but particularly from talloil which is a mixture of fatty and rosin acids obtained as a by-product in paper manufacture from pine and other non-deciduous woods, first by forming nitriles under conditions such that no substantial amount of reaction products boiling above the boiling range of the starting acids are formed, and then reacting the so-formed nitriles with free sulfur at an elevated temperature for a length of time sufficient to give a homogeneous product but insufficient to cause the formation of mineral oil-insoluble products. I have discovered that nitriles which are higher boiling than the starting acids from which they were prepared, apparently due to polymerization during their formation, on sulfurizing yield products which are substantially oil-insoluble and therefore unsuitable in the present application. Further, I have discovered that nitriles, even though they may be of suitable boiling range, likewise yield substantially oil-insoluble products on sulfurization unless the reaction between the nitriles and sulfur is carried out in relatively short time.

When such starting materials as stearic acid, oleic acid or lard oil acids are used, various heretofore known methods of preparing the nitriles are suitable. However, it is preferred to use talloil due to its availability and low cost, and with this starting material these known methods generally give a product containing a considerable proportion of nitriles which boil higher than the boiling range of the talloil and which on sulfurization form undesirable oil-insoluble products. In order to use nitriles prepared from talloil according to methods heretofore known, it usually is necessary to remove the high boiling material, for instance by distillation, thus sacrificing yield of nitriles in order to obtain the desired quality. I have discovered that nitriles of suitable boiling range may be prepared from talloil in accordance with the reactions listed above by contacting the talloil in liquid phase and at elevated temperature with ammonia vapor under such conditions that the time of contact is relatively short, for instance not more than say twenty minutes and preferably less if possible. This causes the desired reactions to proceed without allowing the reactions that result in the formation of high boiling nitriles to take place to a substantial extent. In order to obtain the desired high yield in such short time of contact it obviously is requisite that very intimate contact between the talloil and ammonia vapor be effected, and it has been found that a packed column provides a particularly suitable means of effecting an intimate but short-timed contact. Further, it is desirable to carry out the reaction in the presence of a dehydrating catalyst such as alumina or silica gel in order to accelerate the reaction, and a preferable means of accomplishing this is by employing catalyst as the packing material for the contact column. Thus the preferred method of preparing nitriles according to the invention comprises continuously feeding heated talloil to the top of a contact column packed with a dehydrating catalyst, continuously passing ammonia vapor through the column and allowing the talloil to trickle over the catalyst and flow by gravity to the base of the column, thereby effecting an intimate contact of short duration between the liquid and vapor phases.

The optimum temperature range for carrying out the contact operation between talloil and ammonia vapor has been found to be about 325–375° C., this giving the maximum yield of nitriles of suitable boiling range. Temperatures below 325° C. tend to cause decreased rate of reaction, thus requiring a longer time of contact with a resultant increase in the proportion of undesirable high-boiling material formed. Temperatures above 375° C. tend to cause decreased yield of desirable nitriles, possibly by causing cracking of the reaction products, cracking of the talloil itself and perhaps an unfavorable displacement in the equilibrium of the first step of reaction illustrated by Equation 1, supra.

Sulfurization of the nitriles is accomplished by reacting elemental sulfur with the nitriles and may be carried out in either batch or continuous manner. There are two critical, interrelated factors involved in this step, namely, the reaction temperature and the time of reaction. In order to initiate the reaction between nitriles and sulfur, a temperature of about 190° C. is required. A temperature such as 180° C., although not considerably below 190° C., gives an exceedingly slow rate of reaction. After the reaction has been initiated by raising the temperature of a mixture of nitriles and sulfur to 190° C., there is a tendency toward further increase in temperature due to the exothermic nature of the reaction. This is not objectionable provided the processing equipment is properly designed for handling the materials at higher temperature with safety. A short reaction time is exceedingly important in preventing formation of undesirable oil-insoluble reaction products of a sludge-like nature. Thus it is desirable that the reaction be allowed to proceed only so long as to give a product which will be homogeneous at ordinary temperature but not so long as to cause formation of such oil-insoluble products. The proper time of reaction depends on the proportion of sulfur used and the reaction temperature; the less the proportion of sulfur and the higher the reaction temperature, the shorter being the required reaction time. At a temperature of about 190–200° C., it is desirable that the reaction time be not over about 15 minutes, although somewhat longer reaction times may not be too unsatisfactory for practical operation.

In the accompanying single sheet of drawing there is shown schematically a preferred form of apparatus for practicing the invention, which, for purposes of illustration, is described in connection with the processing of talloil, but which is also suitable for the processing of other charge stocks such as stearic acid, oleic acid and lard oil acids.

As shown in the drawing, talloil, which may be either crude or refined and which usually will conform to the following specifications:

| | |
|---|---|
| Saponification No. | 170–185 |
| Acid No. | 160–180 |
| Iodine No. | 90–130 |
| Fatty Acids _____per cent__ | 44–60 |
| Rosin acids, calculated as abietic acid _____do____ | 34–47 |
| Sterols, higher alcohols, hydrocarbons, etc. _____do____ | 6–10 |
| Moisture _____do____ | 0.1–0.3 |
| Ash _____do____ | 0.1 | is charged to the process by means of charge pump 2. The tall-oil passes through preheater 3, where its temperature is raised to 325–375° C., and into contact column 4. It has been found that talloil at such elevated temperature has a tendency to decompose when not in the presence of ammonia, and in order to prevent such decomposition it is desirable that the time interval between entrance of the oil to preheater 3 and its entrance into contact column 4 be short. It also is desirable to add a small proportion of ammonia to the talloil before preheating as further insurance against decomposition, and line 5 containing valve 6 is provided for this purpose. Contact column 4 is packed with a granular dehydrating catalyst 7 such as alumina, the catalyst being supported at a point above the bottom of the column by a suitable catalyst support 8 such as a wire grille. The entering talloil preferably is distributed evenly on the alumina near the top of contact column 4 by means of a distributor 9 which may be of any suitable form. Ammonia vapor, preferably anhydrous, is preheated to a temperature of 325–375° C. in preheater 10 and is passed into the column suitably at a point just below catalyst support 8. The talloil flows down the column as a thin film on the surfaces of the catalyst and countercurrently to the ascending ammonia vapor stream, thereby intimately commingling with the ammonia. At the top of contact column 4 there is provided vapor outlet line 11 through which effluent vapors, comprising excess ammonia, water formed in the reaction and any low boiling organic materials present or formed during the reaction, are withdrawn. These vapors preferably are passed through apparatus for separately recovering ammonia and any low boiling organic materials, which is not shown in the drawing since apparatus suitable for accomplishing this is well known and forms no part of the present invention. The liquid stream flows by gravity from the catalyst zone and collects in the base of the column, and sight gauge 12 is provided as an aid in maintaining a low liquid level therein. The liquid level is regulated by means of valve 13 in outlet line 14 or by varying the speed of pump 15. The reaction product which is withdrawn from the base of the column by means of pump 15 consists predominately of nitriles having a boiling range not higher than that of the talloil charge stock, provided the contact column is of suitable height and proper operating conditions are maintained.

Contact column 4 obviously should be insulated or provided with suitable heating means for maintaining a temperature of 325–375° C.

On continued operation the catalyst 7 in contact column 4 usually will decrease inactivity due to deposition of small amounts of gums, resins or polymerized materials. Regeneration of the catalyst may be accomplished, when desired, by washing with a suitable solvent, for instance, benzene.

The nitrile product withdrawn from the contact column 4 flows through cooler 16, where its temperature is reduced preferably to a level such that the temperature within sulfurizing column 17 will be about 190–200° C., whence it passes to the base of sulfurizing column 17. Sulfur also is added near the base of the column in proportion desired for reaction with the nitriles. As illustrated in the drawing, this may be done by feeding finely divided sulfur from hopper 18 to the column by means of screw conveyor 19. Sulfurizing column 17 is provided with a stirrer driven by electric motor 20 and comprising a centrally located shaft along which is attached in suitable space arrangement a plurality of blades or other means for dispersing the sulfur and effecting intimate contact between the nitriles and sulfur as the mixture flows up the column. It is desirable that sulfurizing column 17 be of sufficiently small diameter so that the mixing effected by the stirrer is mainly lateral without a substantial amount of vertical mixing in order that a reasonably definite continuous flow of the mixture up the column obtains. Sulfurizing column 17 also is provided with a plurality of outlet lines 21 *a, b, c, d, e, f* vertically spaced along its upper section, all provided with valves by means of which the level of withdrawal of reaction products is controlled. With this arrangement the time of reaction between the nitriles and sulfur depends on the rate of flow, the diameter of the sulfurizing column and the level from which the reaction mixture is withdrawn; thus for a given rate of charge to the process the reaction time may be varied as desired by varying the level of withdrawal. In order to maintain the desired short reaction time for various rates of flow, one of the lower levels, for instance line 21*a*, would be used for a slow rate of flow while a higher level, for instance line 21*e*, would be used for a faster rate. Obviously the equipment must be properly designed to allow suitable adjustment for any charge rate that may be employed.

The sulfurized nitriles from column 17 flow through cooler 22 and thence may be sent to storage or directly to a blending tank as base stock for compounding special lubricants.

In the step of preparing nitriles from talloil, the importance of a short time of contact as effected in the process described above is illustrated by the following comparison between the present method and a known method comprising prolonged batch treatment of liquid talloil with ammonia vapor:

|  | Known Method (Prolonged batch treatment) | Present Method (Short-timed countercurrent treatment) |
| --- | --- | --- |
| Reaction temperature | 260–290° C. | 340–375° C. |
| Approximate time of contact | 6 hrs. | 10 min. |
| Acid number of talloil charge | 175 | 175. |
| Acid number of product | 5.5 | 4.7. |
| Per cent of product having suitable boiling range | 55 | 92. |
| Yield of nitriles of suitable boiling range, calc'd. as per cent of maximum possible yield. | 52 | 89. |

As indicated by the acid numbers of the products, approximately the same proportion of the charge was converted to nitriles in each case. However, with the known method only 55 per cent of the product was of suitable boiling range (i. e. not higher than the boiling range of the talloil), whereas 92 per cent of the product prepared according to the present method was of suitable boiling range. Thus the latter product contained only 8 per cent of nitriles of higher boiling range —an amount insufficient to cause the product on sulfurization to yield oil-insoluble material— while the product of the known method contained 45 per cent of such higher boiling nitriles which rendered it unsuitable for preparation of oil-soluble sulfurized products.

In the step of sulfurizing the nitriles, the importance of a short reaction time may be demonstrated by sulfurizing samples of the nitriles for various lengths of time, mixing the sulfurized samples with mineral oil and noting the amounts of insoluble material, filtering the blends to remove the insoluble material, then allowing the filtered blends to age at a low temperature and noting any further formation of insoluble material. The data given below are illustrative of experiments of this type which have been made with nitriles prepared from talloil according to the method described above. In each of these experiments 25 parts of sulfur were reacted with 75 parts of nitriles at a temperature of 190–200° C., and 10 parts of the resulting sulfurized nitriles were blended with 90 parts of mineral oil.

| Reaction time, minutes | Amount of insoluble material in unfiltered blend | Observations on filtered blend after aging at 6° C. |
| --- | --- | --- |
| 5 | trace | no separation after 30 days of aging. |
| 35 | small amount | precipitate after 6 days of aging; black sludge after 8 days of aging. |
| 65 | considerable amount | precipitate after 3 day of aging; black sludge after 7 days of aging. |

This tabulation indicates that a reaction time less than 35 minutes is required in order to produce stable products.

Sulfurized nitriles prepared as described herein are useful base stock for manufacture of special lubricants for use in severe service, such as non-emulsifiable mild extreme pressure lubricants, emulsifiable cutting oil, and greases. A preferable sulfur content for such base stock is 20–25 per cent, although it is not difficult to incorporate somewhat higher proportions of sulfur in the nitriles. In preparing moderately extreme pressure lubricants, this base stock may be blended with any type of mineral oil of suitable viscosity and flash point, 10 parts of base stock to 90 parts of oil being a usual proportion although more or less may be desirable depending on the particular use to which the product is to be put.

The sulfurized nitriles may be made suitable for use in the preparation of special lubricants which are non-corrosive to such metals as brass, copper, bronze and aluminum, by treatment with an alkali to remove free or loosely bound sulfur.

Sulfurized esters or glycerides of fatty acids have been used in various special lubricants. In many cases sulfurized nitriles may be used to advantage in place of the sulfurized esters or glycerides. For instance, lubricants which contain esters or glycerides may undergo hydrolysis or become rancid, thus developing an acidity which renders these materials corrosive. Furthermore this hydrolysis also may be objectionable since many of these lubricants, for best performance, should be slightly alkaline, as is the case with various soluble oils and greases. Sulfurized nitriles, on the other hand, do not undergo hydrolysis under conditions encountered in service and therefore have particular utility in the manufacture of such special lubricants.

Many modifications in apparatus and method of operation for practicing the invention will be apparent, and it is to be understood that the invention is not to be limited to the particular embodiment disclosed and described herein.

I do not herein claim the hereindescribed lubricant, the same forming the subject matter of a divisional application filed October 28, 1943, Serial No. 508,061, now U. S. Patent 2,380,531.

I claim:

1. As a new composition of matter, oil-soluble sulfurized nitriles of organic acids having at least ten carbon atoms and selected from the group consisting of fatty acids, rosin acids and mixtures of fatty and rosin acids, said sulfurized nitriles containing essentially only the elements derived from the nitriles and the sulfur.

2. As a new composition of matter, oil-soluble sulfurized nitriles of talloil, said sulfurized nitriles containing essentially only the elements derived from the nitriles and the sulfur.

3. The method of sulfurizing nitriles of talloil in order to produce a substantially oil-soluble sulfurized product which comprises reacting said nitriles with sulfur at a temperature not substantially less than 190° C. but below the decomposition temperature of the sulfurized nitriles for a time of at least five minutes but less than thirty-five minutes.

SAMUEL EDWARD JOLLY.

REFERENCES CITED

The following references are of record in the file of this patent:

UNITED STATES PATENTS

| Number | Name | Date |
| --- | --- | --- |
| 2,116,472 | Ralston | May 3, 1938 |
| 2,125,853 | Ralston | Aug. 2, 1938 |
| 2,141,142 | Ralston | Dec. 20, 1938 |
| 2,218,918 | Loane | Oct. 22, 1940 |
| 2,230,390 | Signaigo | Feb. 4, 1941 |

FOREIGN PATENTS

| Number | Country | Date |
| --- | --- | --- |
| 390,120 | Great Britain | Mar. 30, 1933 |